United States Patent [19]

Takano et al.

[11] 4,235,091
[45] Nov. 25, 1980

[54] APPARATUS FOR TESTING POWER TRANSMISSION BELT

[75] Inventors: Hiroshi Takano, Miki; Yasuhiro Hashimoto, Kobe; Mutsuo Takesako, Akashi, all of Japan

[73] Assignee: Mitsuboshi Belting Limited, Kobe, Japan

[21] Appl. No.: 954,951

[22] Filed: Oct. 26, 1978

[30] Foreign Application Priority Data

Oct. 26, 1977 [JP] Japan ............................ 52/144393[U]

[51] Int. Cl.³ ........................ G01N 3/56; G01M 13/02
[52] U.S. Cl. ......................................... 73/7; 73/118; 73/812
[58] Field of Search .................... 73/133 R, 134, 162, 73/7, 9, 118, 810, 851, 812

[56] References Cited

U.S. PATENT DOCUMENTS

| | | | |
|---|---|---|---|
| 1,482,706 | 2/1924 | Short | 73/162 |
| 3,595,073 | 7/1971 | Morris | 73/134 |
| 3,739,632 | 6/1973 | Miller et al. | 73/162 X |
| 3,956,929 | 5/1976 | Jenkins et al. | 73/133 R |

FOREIGN PATENT DOCUMENTS 420934  8/1974  U.S.S.R. .............................. 13/133 R

Primary Examiner—Charles A. Ruehl
Attorney, Agent, or Firm—Sughrue, Rothwell, Mion, Zinn and Macpeak

[57] ABSTRACT

An apparatus for testing power transmission belts is disclosed, wherein at least one test belt is mounted between at least one drive and driven motors each having corresponding numbers of drive and driven pulleys, respectively. The pitch diameter of the drive pulley is larger than that of the driven pulley to generate electric power in the driven motor. The test belt is subject to various loads due to torque variation of both drive and driven motors or either one of the motors by connecting a transformer to both or either one of the motors.

22 Claims, 18 Drawing Figures

F I G. 14
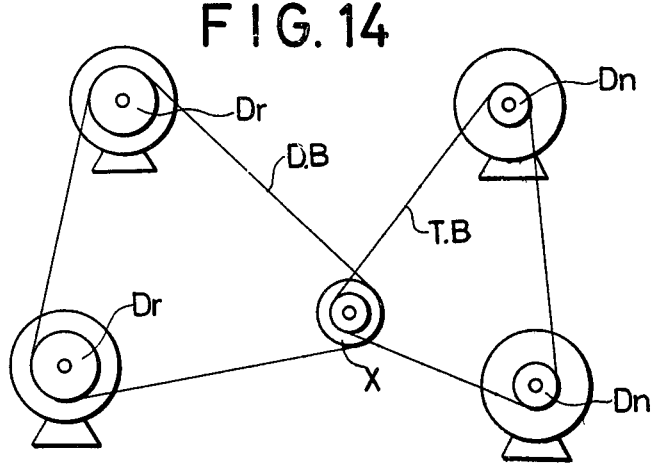
F I G. 15
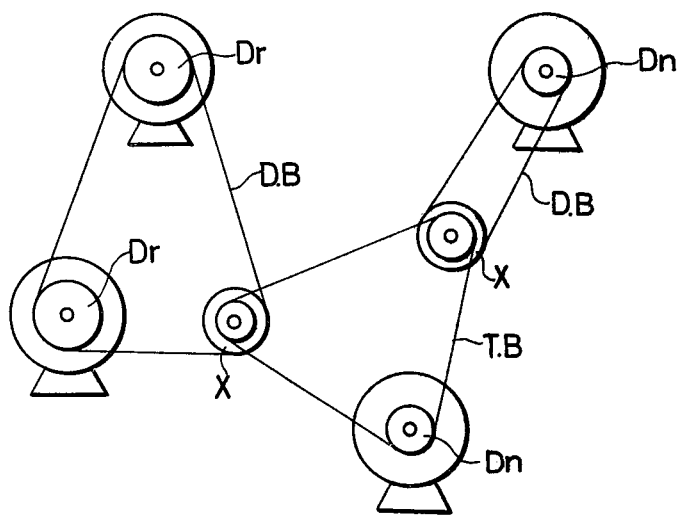
F I G. 16
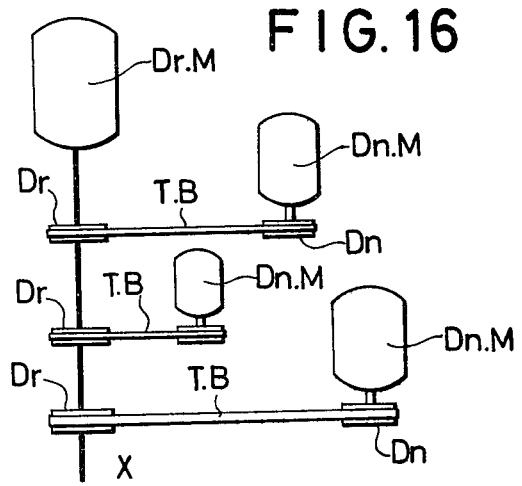

APPARATUS FOR TESTING POWER TRANSMISSION BELT

BACKGROUND OF THE INVENTION

This invention relates to an apparatus for testing power transmission belts such as frictional power transmission belts such as a V-belt, flat belt and poly-V-belt having a zig-zag pattern in cross section at the inner surface thereof, or a synchronous transmission belt in the form of a timing belt, and more particularly, to a type thereof in which a belt to be tested is mounted between pulleys, to which drive and driven motors are directly or indirectly connected to investigate belt efficiency by applying various loads thereto by means of the rotational timing differential between the motors.

According to the conventional apparatuses for testing the running state of the frictional power transmission belts, the belt to be tested is mounted between a drive pulley secured to a drive motor and a driven pulley whose shaft is connected to a water wheel in order to control rotation of the driven pulley, whereby various loads are applied to the test belt. This is a so-called "water brake" system. However, in this system, it would be rather difficult to apply various loads to the test belt since it is difficult to control rotation of the driven pulley by the water wheel, and further, since the electric power consumption of the drive motor cannot be reduced.

SUMMARY OF THE INVENTION

It is therefore, an object of this invention to overcome the above-mentioned drawbacks and to provide an improved apparatus for testing power transmission belts.

This object is attained in accordance with this invention by providing at least two pulleys each secured to induction motors, and a test belt mounted between the pulleys. Pitch diameters of these pulleys are so determined that the drive motor rotates with the rotation number lower than its synchronous rotation number, while the driven motor rotates with the rotation number higher than its synchronous rotation number. Alternatively, a plurality of test belts are mounted through intermediate pulleys secured to at least one intermediate shaft disposed between these motors. These motors are rotated in the same direction by the mounting of the test belt. Voltage of either the drive motor or the driven motor is changed by a transformer so as to generate torque variations in the shaft of the motor, to thereby vary the load applied to the test belt. Further, because of the suitable pitch diameters of these pulleys, one of the motors functions as a dynamo, so that electric power generated thereby is supplied into the other motor by a suitable feed back circuit, whereby economical testing operation results.

This invention will be described with respect to the drawings and the description of the preferred embodiments that follows.

BRIEF DESCRIPTION OF THE DRAWINGS

In the drawings,

FIGS. 10 through 15 are schematic illustrations showing examples of belt mountings wherein at least one intermediate shaft is employed; and FIG. 16 is a schematic illustration showing still another embodiment of this invention.

DETAILED DESCRIPTION OF THE PREFERRED EMBODIMENTS

Figure 1:
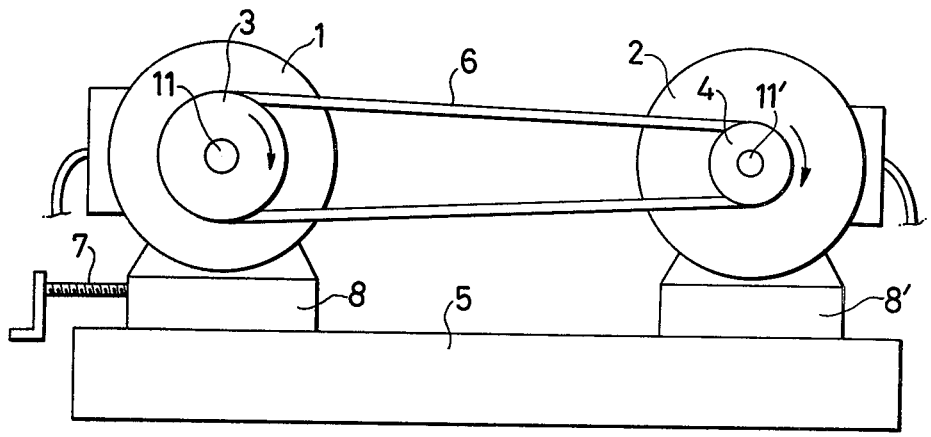
FIG. 1 shows a schematic view of an apparatus according to this invention.

Referring now to the drawings and initially to FIG. 1, reference numerals 1 and 2 designate drive and driven motors, respectively, each having rotation shafts 11 and 11'. The drive motor 1 is the same as the driven motor 2, such as a single-phase, three-phase and four-phase induction motors. A pulley 3 and a pulley 4 each having different pitch diameter are fixedly secured to the shafts 11 and 11', respectively to mount a test belt 6 such as a V-belt, a flat belt or a poly-V-belt having a zig-zag pattern in cross section at the inner surface thereof between the pulleys. These pulleys have a V-shaped annular groove in cross section. As shown in FIG. 1, the pitch diameter of the drive pulley 3 is larger than that of the driven pulley 4. The pulleys can be replaced with other kinds of pulleys in accordance with the kinds of belts to be tested.

Bases 8 and 8' are engaged with a rail member 5 and the drive and driven motors 1 and 2 are mounted on the bases 8 and 8', respectively. An adjusting screw 7 is secured to the base 8 so as to slidingly move the same on the rail 5, to thereby control the tension applied to the test belt 6.

Figure 2A:
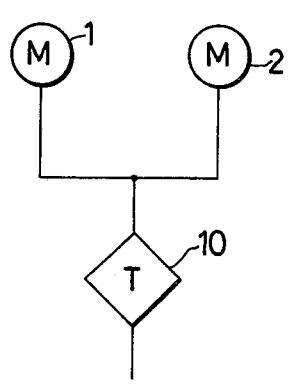
FIGS. 2(a) through 2(c) show schematic diagrams showing examples of the disposition of motors and a transformer according to this invention.
Figure 2B:
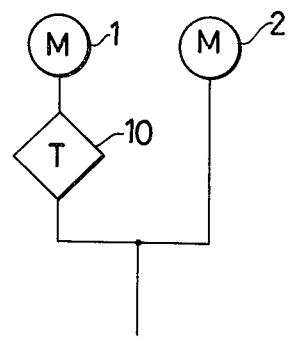
Figure 2C:
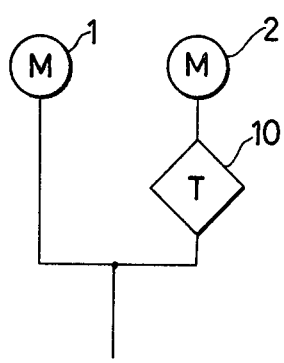

As shown in FIG. 2(a), a transformer T is provided to simultaneously change the voltage applied to the motors 1 and 2, to thereby change the torque of the shafts 11 and 11', while as shown in FIGS. 2(b) and 2(c), the transformer T is provided to change the torque of either the shaft 11 or the shaft 11'.

With this structure, in rotating the shaft 11 of the drive motor 1 in a direction shown by an arrow, the rotation number of the pulley 4 exceeds synchronous rotation number, or running speed, of the shaft 11' of the driven motor 2, so that the motor 2 functions as a dynamo to generate electric power, and therefore, the electric power can be supplied into the drive motor 1 by a suitable feed-back circuit (not shown) to thereby reduce electrical power consumption.

Figure 3:
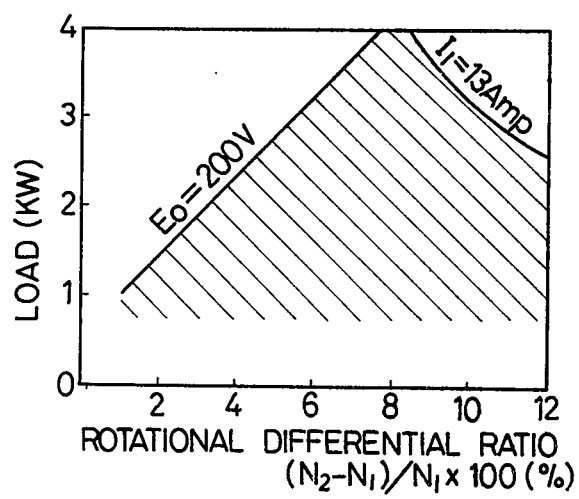
FIG. 3 is a graphical representation showing the relationship between the load applied to a drive motor and a rotation number differential ratio between the drive and driven motors.

The principles in accordance with this invention will be described. In FIG. 3, the pulley 3 and the pulley 4 having a pitch diameter of 83 mm and 76 mm respectively are prepared. Four-phase induction motors having rated watt values of 3.7 KW are used as drive and driven motors. The rotation numbers, or r.p.m., $N_1$ and $N_2$ of the pulleys 3 and 4 are measured and the rotation differential ratio is measured as $(N_2-N_1)/N_1$. In this case, the allowable load applied to the drive motor 1 is in a range shown by a hatched portion.

When the test belt 6 is mounted between the pulleys 3 and 4 and the motor 1 is energized, the belt runs to cause a rotational number differential ratio between the pulleys such as $N_1/N_2$. In this case, since slippage occurs between the belt and the pulleys at the slippage ratio of 1 to 2% in case of the employment of a V-belt or a flat belt, substantial rotation ratio would be substantially the differential between the theoretical rotation ratio $N_1/N_2$ and the slippage ratio.

Figure 4:
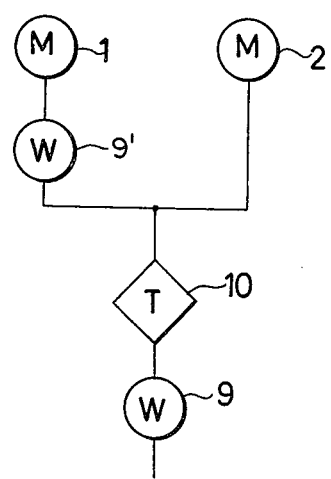
FIG. 4 shows a schematic diagram showing the relative disposition of motors, a transformer and wattmeters.

Wattmeters 9' and 9 are connected to the drive motor 1 and the transformer 10, respectively as shown in FIG. 2(a) to provide a diagram as shown in FIG. 4. With the substantial rotation ratio thus maintained, when the voltage is changed by the transformer 10, watt value difference is observed between the wattmeters 9' and 9. These values are hereby defined as $W_8$ and $W_9$. The load applied to the test belt relative to the electric power consumption amount $W_9$ is measured by the watt value $W_8$.

Various belt properties can be evaluated using the test apparatus, such as the ability of the belt to withstand wear, the transmission efficiency of the belt or the durability of the belt, i.e, the time required for the belt to break under predetermined conditions. The wear-withstanding characteristics of the belt would merely be determined by periodically stopping the machine to visually inspect the belt, while the transmission efficiency of the belt could be determined by measuring the relative rotational speeds of the pulleys and comparing this to the theoretical relative rotational speeds thereof. Obviously, the durability would be measured by merely noting the time at which the testing commenced and the time at which the belt failed.

Figure 5:
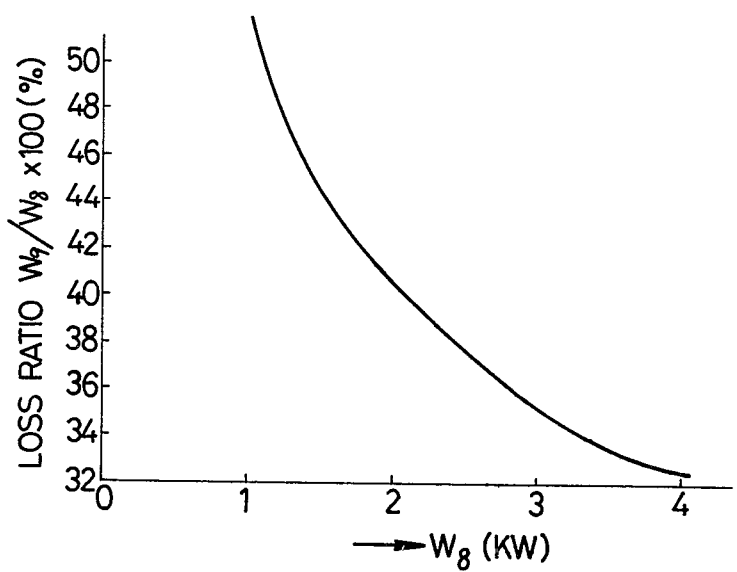
FIG. 5 is a graphical representation showing a relationship between ratio of electrical loss and load applied to a test belt.
Figure 6:
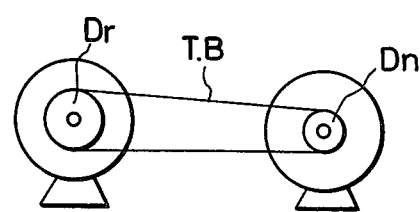
FIGS. 6 through 9 are schematic illustrations showing a test belt mounted between drive and driven motors.

The ratio of the electric consumption amount ($W_9$) to the load applied to the test belt ($W_8$) is plotted on the vertical axis and the load applied to the test belt $W_8$ is plotted on the horizontal axis as shown in FIG. 5. The ratio of the electric consumption amount to the load applied to the test belt is called "Loss ratio $W_9/W_8$."

According to FIG. 5, it is understood that Loss ratio is decreased with the increase of the load applied to the test belt. When the load applied to the test belt becomes 3.7 KW, which is the rated load of the motor 1, the loss ratio becomes about 33%, and therefore, the testing operation is conducted by about ⅓ of the electrical power required in the conventional tester.

In case of testing the efficiency of the timing transmission belt as a test belt, desired operation can be effectuated by providing toothed pulleys instead of the ordinary V pulleys.

The foregoing is described in terms of the combination of single drive motor and single driven motor. However, according to this invention, a plurality of drive and driven motors in combination with at least one intermediate shaft are also employed to conduct testing operation. These various combinations are listed in the following Table.

| Example. | Number of Drive Motors | Number of Driven Motors | Number of Intermediate Shafts |
|---|---|---|---|
| No. 1 | single | single | Nil. |
| No. 2 | single | plural | Nil. |
| No. 3 | plural | single | Nil. |
| No. 4 | plural | plural | Nil. |
| No. 5 | single | single | single |
| No. 6 | single | single | plural |
| No. 7 | single | plural | single |
| No. 8 | single | plural | plural |
| No. 9 | plural | single | single |
| No. 10 | plural | single | plural |
| No. 11 | plural | plural | single |
| No. 12 | plural | plural | plural |

FIGS. 6 through 15 show schematic illustrations showing various combinations of the drive and driven motors and the intermediate shaft(s). For the sake of simplicity, the following abbreviations are used in these drawings.

Dr.—a pulley secured to a drive motor
Dn—a pulley secured to a driven motor
X—a pulley secured to an intermediate shaft
$D_B$—a drive belt
$T_B$—a test belt In FIGS. 6 through 9, a various combinations of drive and driven motors are shown, wherein no intermediate shaft is used. The embodiment shown in FIG. 6 corresponds to No. 1 in the above Table in which pulleys Dr and Dn are respectively secured to a single drive motor and a single driven motor. These pulleys have different pitch diameters with each other and a test belt $T_B$ is mounted therebetween. Such construction is the fundamental testing apparatus as also shown in FIG. 1.

Figure 7:
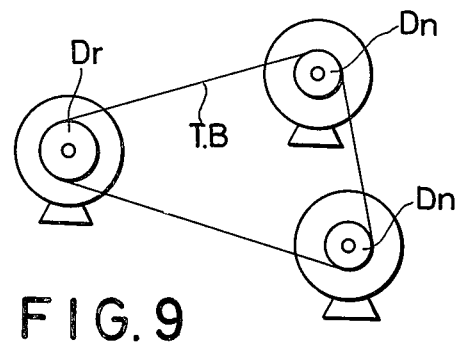
Figure 8:
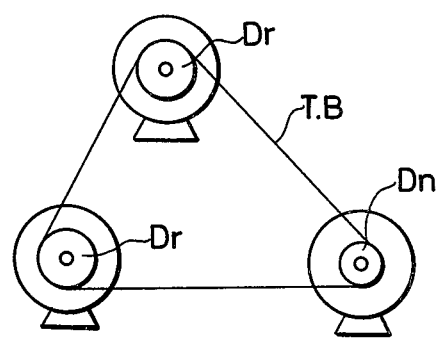
Figure 9:
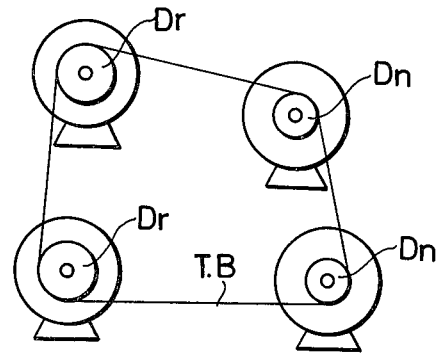

The embodiment shown in FIG. 7 corresponds to No. 2 in which a pulley Dr having a larger pitch diameter than that of two pulleys Dn each secured to driven motors. Similarly, the embodiments shown in FIGS. 8 and 9 correspond to Nos. 3 and 4 in the Table, respectively. These embodiments shown in FIGS. 7 to 9 are effective to test the long belt.

FIGS. 10 through 15 show modified embodiments according to this invention in which at least one intermediate shaft is disposed between the drive and driven motors. In these drawings, though the test belt and the drive belt are shown in distinct manner, at least one drive belt can be replaced with test belt, or all of the belts can be used as test belts.

Figure 10:
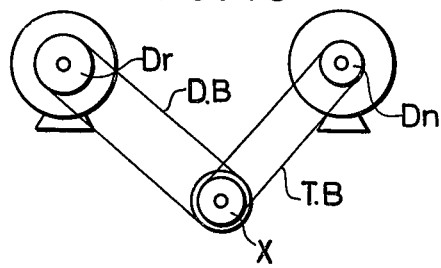

The embodiment shown in FIG. 10 corresponds to No. 5 in Table, in which a single intermediate shaft is disposed between the driven motor having a driven pulley Dn and the drive motor having a drive pulley Dr whose pitch diameter is larger than that of the driven pulley Dn.

Figure 11:
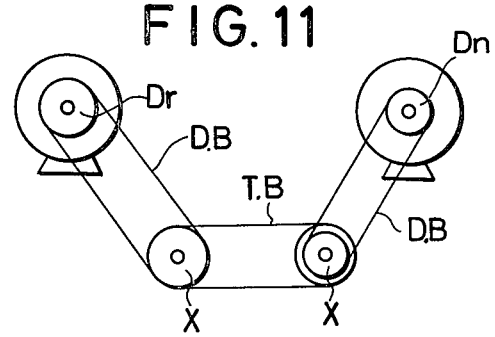

The embodiment shown in FIG. 11 corresponds to No. 6 in Table, in which two intermediate shafts are disposed between the drive and driven motors. Similarly, the embodiments shown in FIGS. 12 and 13 correspond to Nos. 7 and 8, respectively.

Figure 12:
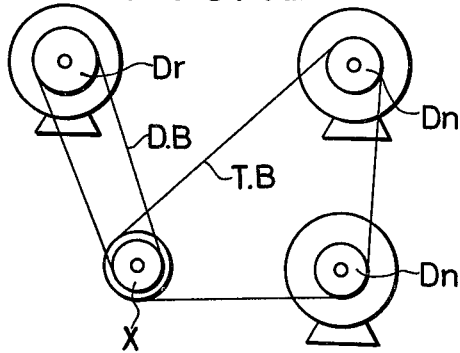
Figure 13:
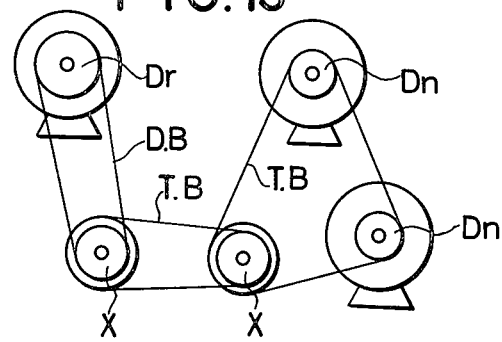

It is apparent that if the drive and driven motors shown in FIGS. 12 and 13 are replaced with each other, the embodiments of Nos. 9 and 10 can be provided, respectively. Further, the embodiments shown in FIGS. 14 and 15 correspond to Nos. 11 and 12, respectively.

FIG. 16 shows still another embodiment according to this invention in which a shaft of a drive motor is extended to coaxially secure a plurality of drive pulleys. In this case, equal plurality of driven pulleys and corresponding numbers of driven motors are provided to mount an equal plurality of test belts between drive and driven pulleys.

The embodiments shown in FIGS. 10 through 16 are particularly effective for testing belt efficiency to obtain optimum rotation number of the pulleys adapted to mount the test belt, as well as to solve spacial problems in installing the apparatus. In this case the drive belt $D_B$ is required to have long duration, high mechanical and fatigue strength. Alternatively, a plurality of drive belts are mounted in parallel or a drive pulley having large pitch diameter is used to realize long duration of use.

With the structure thus organized, various advantages are obtainable in this invention as listed below.

(1) Since ordinary induction motors can be used in the apparatus, and since the apparatus is of simple structure because of the mere combination of drive and driven motors and an intermediate shaft if desired, a remarkably economical apparatus results in comparison with the conventional apparatus.

(2) Since pitch diameters of pulleys are different from each other, one of the motors functions as a dynamo, so that the electrical power generated thereby can be utilized in the other motor by a suitable feed back circuit, to thereby reduce electrical power consumption to less than about ⅓ of that required in the conventional "water brake" system.

(3) Since the transformer is provided, the torque of the motors can be easily changed by changing the voltage applied thereto, to thereby control the load applied to the test belt.

(4) The length of the test belt is easily controlled by the intermediate shaft.

(5) A plurality of test belts are simultaneously tested by providing the intermediate shaft.

(6) The test is conducted in a narrow space by the employment of the intermediate shaft.

(7) A relatively long test belt can be tested by providing a plurality of motors if no intermediate shaft is employed.

It is apparent that modifications of this invention are possible without departing from the essential scope of the invention.

What is claimed is:

1. An apparatus for testing power transmission belts comprising:
   (a) at least one drive motor having a drive pulley mounted on its motor shaft, said drive motor having a synchronous speed,
   (b) at least one driven motor having a driven pulley mounted on its motor shaft, said driven motor having a synchronous speed,
   (c) means for applying an excitation voltage to said drive and driven motors,
   (d) a transformer connected to at least one of said drive motor and driven motor for controlling the excitation voltage applied to the motor to which it is connected, and
   (e) at least one test belt mounted between said drive and driven pulleys, the pitch diameters of said drive and driven pulleys being selected so as to rotate said drive motor at a speed lower than its synchronous speed and to rotate said driven motor at a speed higher than its synchronous speed whereby belt characteristics can be evaluated by inspection of the belt.

2. The apparatus as defined in claim 1, further comprising a transformer connected to both said drive and driven motors for controlling the voltage applied to each of said drive and driven motors.

3. The apparatus as defined in claim 1, wherein said drive and driven motors are single-phase induction motors.

4. The apparatus as defined in claim 1, wherein said drive and driven motors are three-phase induction motors.

5. The apparatus as defined in claim 1, wherein said drive and driven motors are each singularly provided.

6. The apparatus as defined in claim 1, wherein said drive motor is singularly provided while a plurality of said driven motors are provided.

7. The apparatus as defined in claim 6, further comprising at least one intermediate shaft disposed between said drive motor and said plurality of driven motors.

8. The apparatus as defined in claim 7, wherein a plurality of said intermediate shafts are provided.

9. The apparatus as defined in claim 6, wherein said shaft of said drive motor is elongated to coaxially secure a plurality of drive pulleys.

10. The apparatus as defined in claim 1, wherein said driven motor is singularly provided, while a plurality of said drive motors are provided.

11. The apparatus as defined in claim 10, further comprising at least one intermediate shaft disposed between said plurality of drive motors and said driven motor.

12. The apparatus as defined in claim 11, wherein a plurality of said intermediate shafts are provided.

13. The apparatus as defined in claim 1, wherein a plurality of said drive and driven motors are provided.

14. The apparatus as defined in claim 13, further comprising at least one intermediate shaft disposed between said plurality of drive and driven motors.

15. The apparatus as defined in claim 14, wherein a plurality of said intermediate shafts are provided.

16. The apparatus as defined in claim 1, further comprising at least one intermediate shaft disposed between said drive and driven motors, said intermediate shaft having intermediate pulleys to mount at least one additional belt between said drive and driven pulleys therethrough.

17. The apparatus as defined in claim 16, wherein a plurality of said intermediate shafts are provided.

18. The apparatus as defined in claim 1, wherein said test belt is a frictional power transmission belt.

19. The apparatus as defined in claim 18, wherein said belt is a V-belt.

20. The apparatus as defined in claim 18, wherein said belt is a poly-V-belt having a zig-zag pattern in cross section at the inner surface thereof.

21. The apparatus as defined in claim 18, wherein said belt is a flat belt.

22. The apparatus as defined in claim 1, wherein said test belt is a synchronous transmission belt such as a timing belt, whose inner surface is toothed.

* * * * *